(12) United States Patent
Kawase

(10) Patent No.: US 11,140,763 B2
(45) Date of Patent: Oct. 5, 2021

(54) X-RAY GENERATION APPARATUS AND X-RAY IMAGING APPARATUS

(71) Applicant: Canon Anelva Corporation, Kawasaki (JP)

(72) Inventor: Junya Kawase, Yokohama (JP)

(73) Assignee: CANON ANELVA CORPORATION, Kawasaki (JP)

( * ) Notice: Subject to any disclaimer, the term of this patent is extended or adjusted under 35 U.S.C. 154(b) by 0 days.

(21) Appl. No.: 17/194,767

(22) Filed: Mar. 8, 2021

(65) Prior Publication Data

US 2021/0212188 A1 Jul. 8, 2021

Related U.S. Application Data

(63) Continuation of application No. PCT/JP2019/034640, filed on Sep. 3, 2019.

(51) Int. Cl.
*H05G 1/06* (2006.01)
*G01N 23/04* (2018.01)
*G01N 23/083* (2018.01)

(52) U.S. Cl.
CPC ............... *H05G 1/06* (2013.01); *G01N 23/04* (2013.01); *G01N 23/083* (2013.01); *G01N 2223/20* (2013.01)

(58) Field of Classification Search
CPC ............ H05G 1/00; H05G 1/06; H05G 1/025; H05G 1/04; H01J 35/16; G01N 23/04; G01N 23/083; G01N 2223/20
See application file for complete search history.

(56) References Cited

U.S. PATENT DOCUMENTS 7,668,297 B2  2/2010 Inazuru et al.
9,941,090 B2  4/2018 Hadland
(Continued)

FOREIGN PATENT DOCUMENTS

CN  107068519 A  8/2017
JP  H10228875 A  8/1998
(Continued)

OTHER PUBLICATIONS

Decision to Grant a Patent dated Apr. 13, 2020, by the Japanese Patent Office in Japanese Application No. 2020-508068.
(Continued)

*Primary Examiner* — Courtney D Thomas
(74) *Attorney, Agent, or Firm* — Buchanan Ingersoll & Rooney PC

(57) ABSTRACT

An X-ray generation apparatus includes an X-ray generation unit, a storage container configured to store the X-ray generation unit, and an insulating component arranged between an inner surface of the storage container and at least a part of the X-ray generation unit. The insulating component includes a first insulating member and a second insulating member, the first insulating member includes a first portion having a first surface, and a second portion having a second surface, a step difference is formed by the first surface and the second surface, and the second portion has a thickness smaller than that of the first portion, an adhesive surface of the second insulating member and the second surface of the first insulating member are connected by an adhesive material, and a flatness of the second surface is better than a flatness of the first surface.

14 Claims, 9 Drawing Sheets

(56) References Cited

U.S. PATENT DOCUMENTS

| | | |
|---|---|---|
| 9,947,501 B2 | 4/2018 | Hadland |
| 9,966,217 B2 | 5/2018 | Hadland |
| 10,813,203 B2 | 10/2020 | Kawase et al. |
| 2015/0303022 A1* | 10/2015 | Yamada .................. H01J 35/16 378/62 |
| 2019/0150255 A1 | 5/2019 | Kawase et al. |

FOREIGN PATENT DOCUMENTS

| | | |
|---|---|---|
| JP | 2003142567 A | 5/2003 |
| JP | 2016100290 A | 5/2016 |
| TW | 200723341 A | 6/2007 |
| TW | 201817285 A | 5/2018 |

OTHER PUBLICATIONS

International Search Report (PCT/ISA/210) and Written Opinion (PCT/ISA/237) dated Nov. 5, 2019, by the Japanese Patent Office as the International Searching Authority for International Application No. PCT/JP2019/034640.

Office Action dated Apr. 21, 2021, by the Taiwanese Patent Office in corresponding Taiwanese Patent Application No. 109129973, and an English Translation of the Office Action. (7 pages).

* cited by examiner

FIG. 8
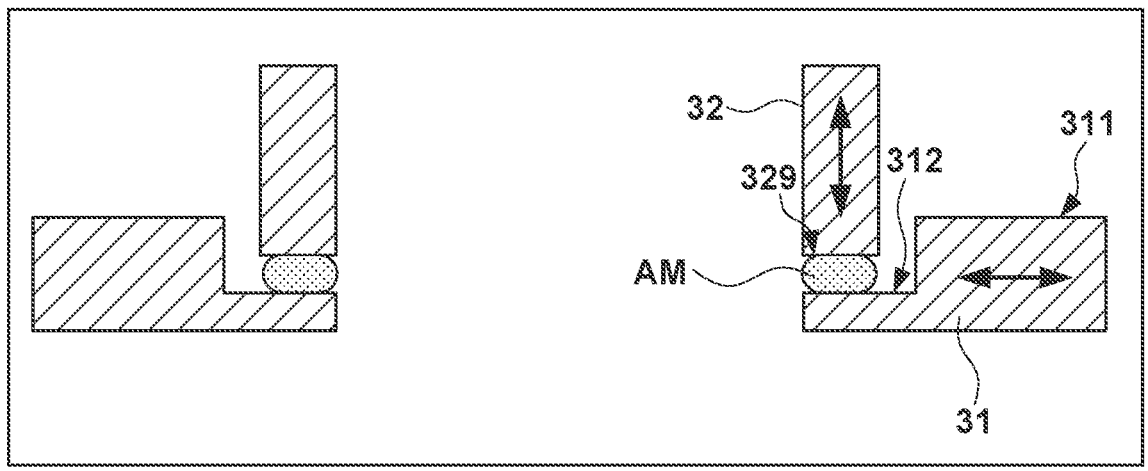
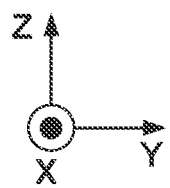
FIG. 9
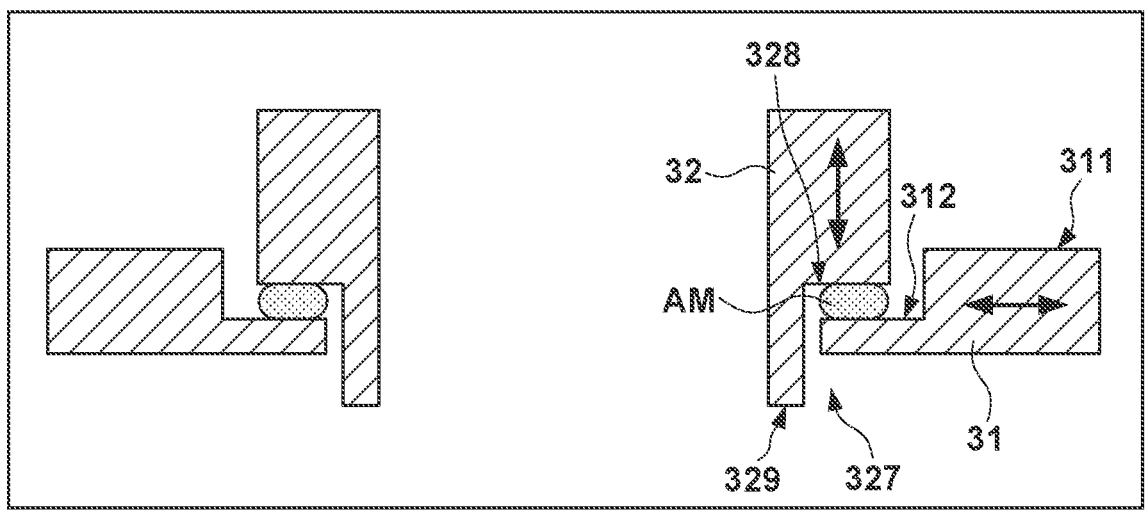
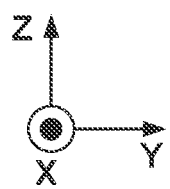

X-RAY GENERATION APPARATUS AND X-RAY IMAGING APPARATUS

CROSS-REFERENCE TO RELATED APPLICATIONS

This application is a Continuation of International Patent Application No. PCT/JP2019/034640, filed Sep. 3, 2019, which is hereby incorporated by reference herein in its entirety.

BACKGROUND OF THE INVENTION

Field of the Invention

The present invention relates to an X-ray generation apparatus and an X-ray imaging apparatus.

Background Art

Japanese Patent Laid-Open No. 2016-100290 describes an X-ray generation apparatus including an insulating container configured to store an X-ray generation tube, and a storage container grounded and configured to store the insulating container, wherein an insulating liquid is arranged between the insulating container and the storage container.

An insulating component arranged between the X-ray generation unit and the storage container that stores the X-ray generation unit can have a shape such as, for example, a box shape or a tubular shape. As a method of inexpensively manufacturing such an insulating component, a method of connecting a plurality of members by an adhesive material is advantageously used. However, in an X-ray generation apparatus in which an insulating component manufactured by such a method is assembled, discharge that extends through the adhesive material may occur.

SUMMARY OF THE INVENTION

The present invention provides an X-ray generation apparatus having a structure advantageous for suppressing an occurrence of discharge extending through an adhesive material.

According to one aspect of the present invention, there is provided an X-ray generation apparatus comprising an X-ray generation unit, a storage container configured to store the X-ray generation unit, and an insulating component arranged between an inner surface of the storage container and at least a part of the X-ray generation unit, wherein the insulating component includes a first insulating member and a second insulating member, the first insulating member includes a first portion having a first surface, and a second portion having a second surface, a step difference is formed by the first surface and the second surface, and the second portion has a thickness smaller than that of the first portion, an adhesive surface of the second insulating member and the second surface of the first insulating member are connected by an adhesive material, and a flatness of the second surface is better than a flatness of the first surface.

BRIEF DESCRIPTION OF DRAWINGS

FIG. 8 is a view showing the arrangement of an insulating component according to the sixth embodiment;
FIG. 9 is a view showing the arrangement of an insulating component according to the seventh embodiment.

DESCRIPTION OF THE EMBODIMENTS

Figure 1:
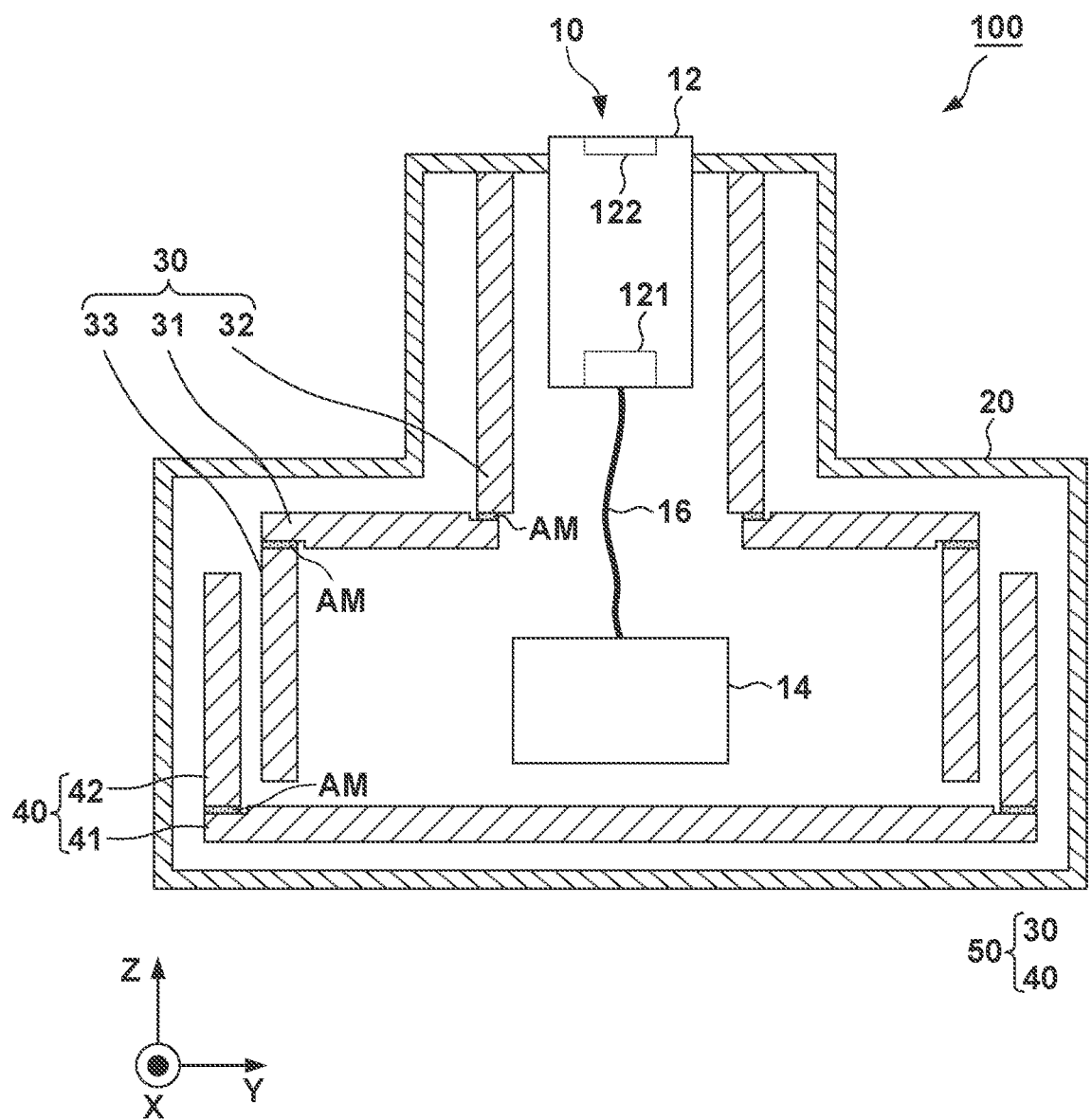
FIG. 1 is a schematic view showing the arrangement of an X-ray generation apparatus according to an embodiment.

Hereinafter, embodiments will be described in detail with reference to the attached drawings. Note, the following embodiments are not intended to limit the scope of the claimed invention. Multiple features are described in the embodiments, but limitation is not made an invention that requires all such features, and multiple such features may be combined as appropriate. Furthermore, in the attached drawings, the same reference numerals are given to the same or similar configurations, and redundant description thereof is omitted.

FIG. 1 schematically shows the arrangement of an X-ray generation apparatus 100 according to an embodiment. The X-ray generation apparatus 100 can include an X-ray generation unit 10, a storage container 20 that stores the X-ray generation unit 10, and an insulating component 50 arranged between the inner surface of the storage container 20 and at least a part of the X-ray generation unit 10. The X-ray generation unit 10 can include an X-ray generation tube 12, and a voltage supply unit 14 that supplies a voltage to the X-ray generation tube 12 via a cable 16. The X-ray generation tube 12 can include a cathode 121 including an electron emitting portion that emits electrons, and an anode 122 including a target that generates X-rays when the electrons radiated from the electron emitting portion collide. The storage container 20 is grounded, and the anode 122 of the X-ray generation tube can electrically be connected to the storage container 20. The voltage supply unit 14 can supply a negative potential to the cathode 121 of the X-ray generation tube 12 via the cable 16. The cable 16 can include a conductive member and an insulating member that covers the conductive member, but may not include the insulating member. The space between the storage container 20 and the insulating component 50 and the space between the insulating component 50 and the X-ray generation unit 10 can be filled with an insulating liquid (for example, insulating oil). The cathode 121 of the X-ray generation unit 10 and the storage container 20 are electrically insulated from each other.

The insulating component 50 can form a container that surrounds the X-ray generation unit 10. In an example, the insulating component 50 can include a first container 30 including a first opening, and a second container 40 including a second opening. The second container 40 can be arranged to store a portion of the first container 30 in the second opening and cover the first opening of the first container 30. The first container 30 can be formed by connecting a plurality of insulating members 31, 32, and 33 by an adhesive material AM. The second container 40 can be formed by connecting a plurality of insulating members 41 and 42 by the adhesive material AM.

The insulating members 31, 32, 33, 41, and 42 are each preferably a resin-impregnated glass fabric laminated body (for example, a laminated plate or a laminated tube) formed by hot-press molding. The resin-impregnated glass fabric laminated body can be formed by, for example, laminating or winding members (prepregs) prepared by impregnating a glass nonwoven fabric in a resin such as an epoxy resin or a phenol resin and then performing hot-press molding. The insulating members 31, 32, 33, 41, and 42 can be made of, for example, epoxy glass. The insulating members 31, 32, 33, 41, and 42 preferably have insulating properties of $1\times10^5$ $\Omega$m or more in a volume resistance at 25° C. The insulating member exemplified as the insulating members 31, 32, 33, 41, and 42 can be a plate-shaped member or a tubular member. The plate-shaped member can have two main surfaces parallel in the extending direction of the glass nonwoven fabric, and one or more end faces (four end faces in a rectangular plate-shaped member) parallel in the laminating direction of the glass nonwoven fabric (the direction orthogonal to the extending direction of the glass nonwoven fabric). The tubular member can have two main surfaces (an outer surface and an inner surface) along the extending direction of the glass nonwoven fabric, and two end faces parallel in the laminating direction of the glass nonwoven fabric (the direction orthogonal to the extending direction of the glass nonwoven fabric). In FIGS. 2 to 9 to be referred to below, the extending direction of the glass nonwoven fabric is indicated by a double headed arrow.

Figure 2:
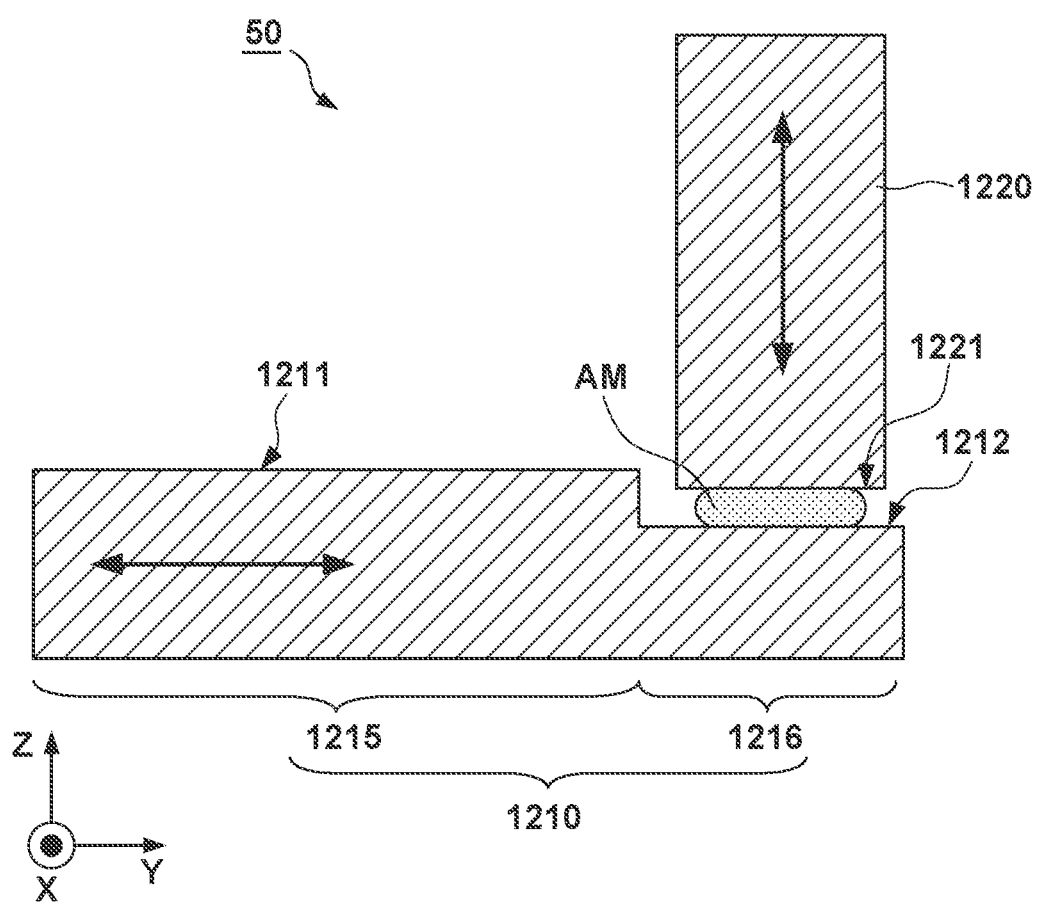
FIG. 2 is a view schematically showing the basic structure of an insulating component.

FIG. 2 schematically shows the basic structure of the insulating component 50. The insulating component 50 can include a first insulating member 1210 and a second insulating member 1220 as a plurality of insulating members. The first insulating member 1210 can include a first portion 1215 having a first surface 1211, and a second portion 1216 having a second surface 1212 that forms a step difference with the first surface 1211 and having a thickness smaller than that of the first portion 1215. The first surface may be, for example, a material surface of commercially available epoxy glass. The adhesive surface (an end face 1221 in the example shown in FIG. 2) of the second insulating member 1220 and the second surface 1212 of the first insulating member 1210 are connected by the adhesive material AM. The flatness of the second surface 1212 is better than the flatness of the first surface 1211. The flatness of the adhesive surface (end face 1221) of the second insulating member 1220 is preferably better than the flatness of the first surface 1211 of the first insulating member 1210. Here, the flatness of a surface means the magnitude of the deviation amount of a surface from a geometrically correct plane, and that the flatness is good means that the magnitude (the magnitude of the deviation amount) representing the flatness is small.

Figure 3:
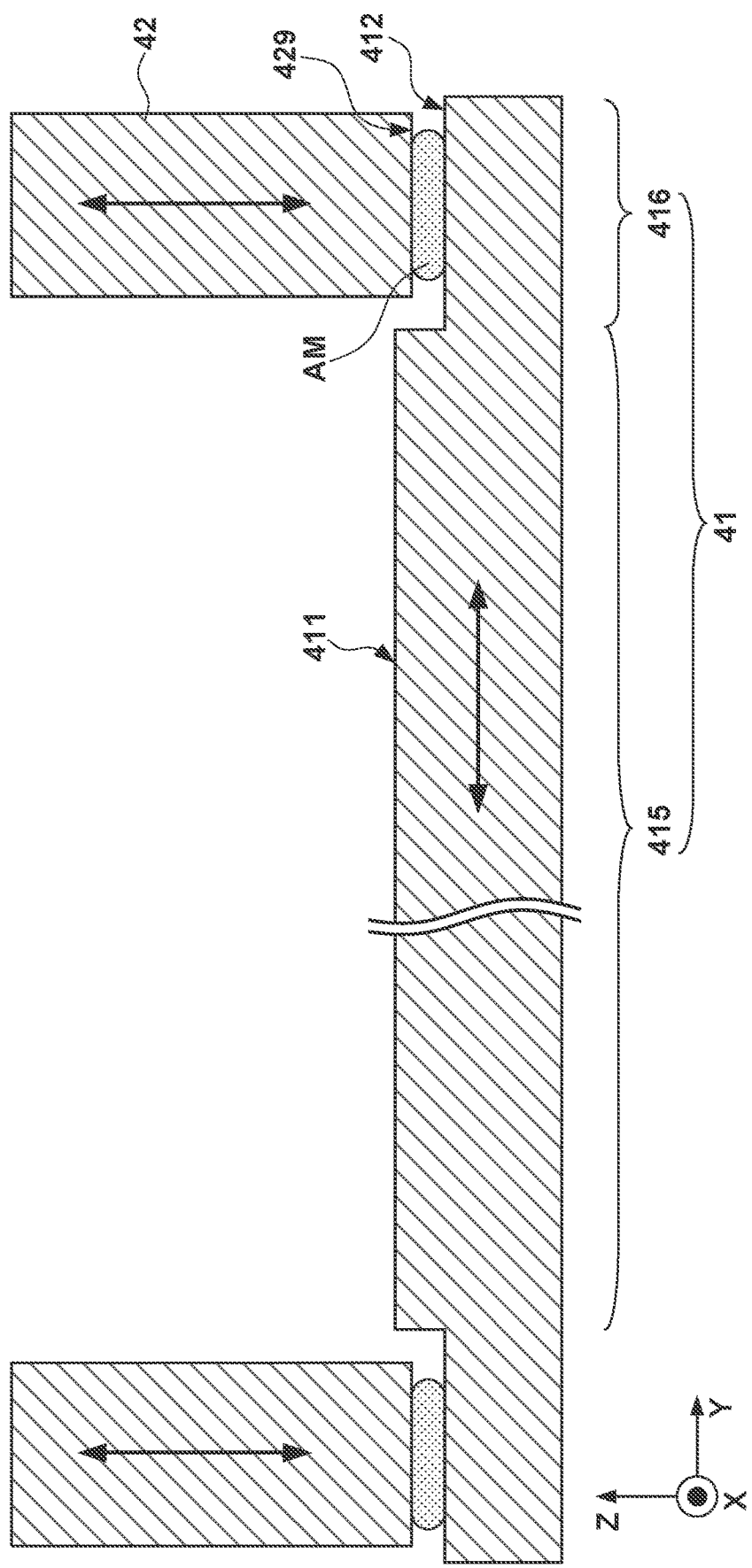
FIG. 3 is a view showing the arrangement of an insulating component according to the first embodiment.

More detailed examples of the arrangement of the insulating component 50 will be described below with reference to FIGS. 3 to 8. FIG. 3 shows the arrangement of a portion of an insulating component 50 according to the first embodiment. The connecting structure between an insulating member 41 and an insulating member 42 is representatively shown here. However, the example of the connecting structure can also be applied to the connecting structure of other insulating members. In the first embodiment, to discriminate the insulating member 41 and the insulating member 42 from each other, the insulating member 41 will be referred to as a first insulating member, and the insulating member 42 will be referred to as a second insulating member for the sake of convenience.

The insulating component 50 can include the first insulating member 41 and the second insulating member 42. The first insulating member 41 can include a first portion 415 having a first surface 411, and a second portion 416 having a second surface 412 that forms a step difference with the first surface 411 and having a thickness smaller than that of the first portion 415. The adhesive surface (an end face 429 in the example shown in FIG. 3) of the second insulating member 42 and the second surface 412 of the first insulating member 41 are connected by an adhesive material AM. The flatness of the second surface 412 is better than the flatness of the first surface 411. The flatness of the adhesive surface (end face 429) of the second insulating member 42 is preferably better than the flatness of the first surface 411 of the first insulating member 41. Typically, the insulating performance of the adhesive material AM is lower than the insulating performance of the first insulating member 41 and the second insulating member 42. The adhesive material AM need only be a solid that has an insulating state at least after curing, and can be, for example, an epoxy resin or a phenol resin.

The first surface 411 of the first insulating member 41 forms one main surface of the first insulating member 41. The first insulating member 41 is an insulating member that can be formed by a resin-impregnated glass fabric laminated body, and has a warp and/or an uneven thickness. On the other hand, the second surface 412 of the first insulating member 41 is formed by processing a material used to produce the first insulating member 41. For this reason, the flatness of the second surface 412 is better than the flatness of the first surface 411 that forms the main surface of the first insulating member 41. The second surface 412 may be called a notch surface. In addition, the end face 429 that is the adhesive surface of the second insulating member 42 is formed by cutting a material used to produce the second insulating member 42. For this reason, the flatness of the end face 429 of the second insulating member 42 is better than the flatness of the first surface 411 that forms the main surface of the first insulating member 41.

Hence, the arrangement in which the second surface 412 of the first insulating member 41 and the adhesive surface (end face 429) of the second insulating member 42 are connected by the adhesive material AM is advantageous for reducing the thickness of the adhesive material AM and suppressing mixing of bubbles in the adhesive material AM. This provides the effect of suppressing discharge via the adhesive material AM in the insulating component 50. The structure having a step difference between the first surface 411 and the second surface 412 is advantageous for increasing the creepage distance. This can contribute to improvement of the insulating performance. On the other hand, in a comparative example in which the first surface 411 of the first insulating member 41 and the adhesive surface of the second insulating member 42 are connected by an adhesive material, the thickness of the adhesive material AM needs to be increased to compensate for the poor flatness of the first surface 411, and this may result in degradation of insulating performance. This may also induce mixing of bubbles. Hence, in the comparative example, discharge via the adhesive material AM may occur.

Figure 4:
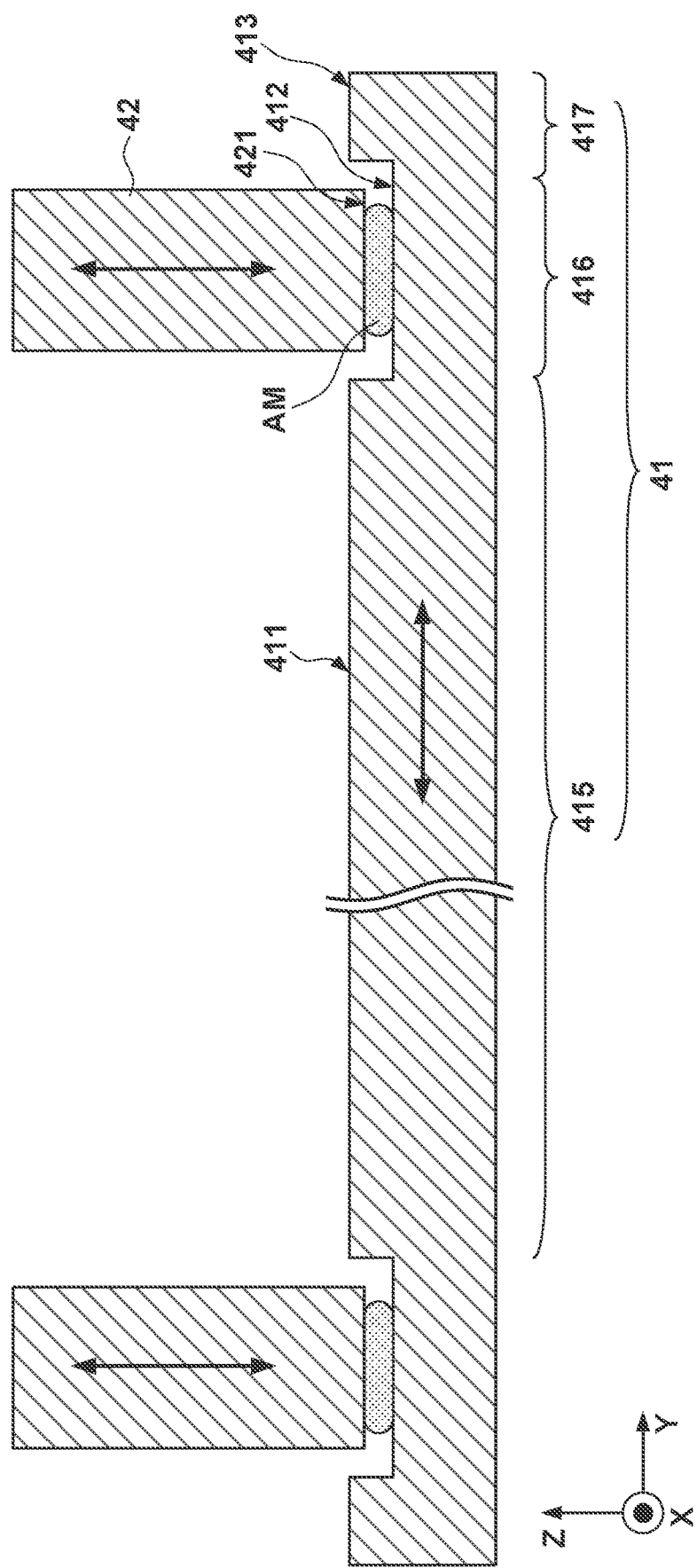
FIG. 4 is a view showing the arrangement of an insulating component according to the second embodiment.

FIG. 4 shows the arrangement of a portion of an insulating component 50 according to the second embodiment. The connecting structure between an insulating member 41 and an insulating member 42 is representatively shown here. However, the example of the connecting structure can also be applied to the connecting structure of other insulating members. In the second embodiment, to discriminate the insulating member 41 and the insulating member 42 from each other, the insulating member 41 will be referred to as a first insulating member, and the insulating member 42 will be referred to as a second insulating member for the sake of convenience. The second embodiment is a modification of the first embodiment, and matters that are not mentioned as the second embodiment comply with the first embodiment. The first insulating member 41 includes not only a first portion 415 and a second portion 416 but also a third portion 417 having a third surface 413 that forms a step difference with the second surface 412 and having a thickness larger than that of the second portion 416. The second portion 416 is arranged between the first portion 415 and the third portion 417 to form a concave portion of the first insulating member 41.

Figure 5:
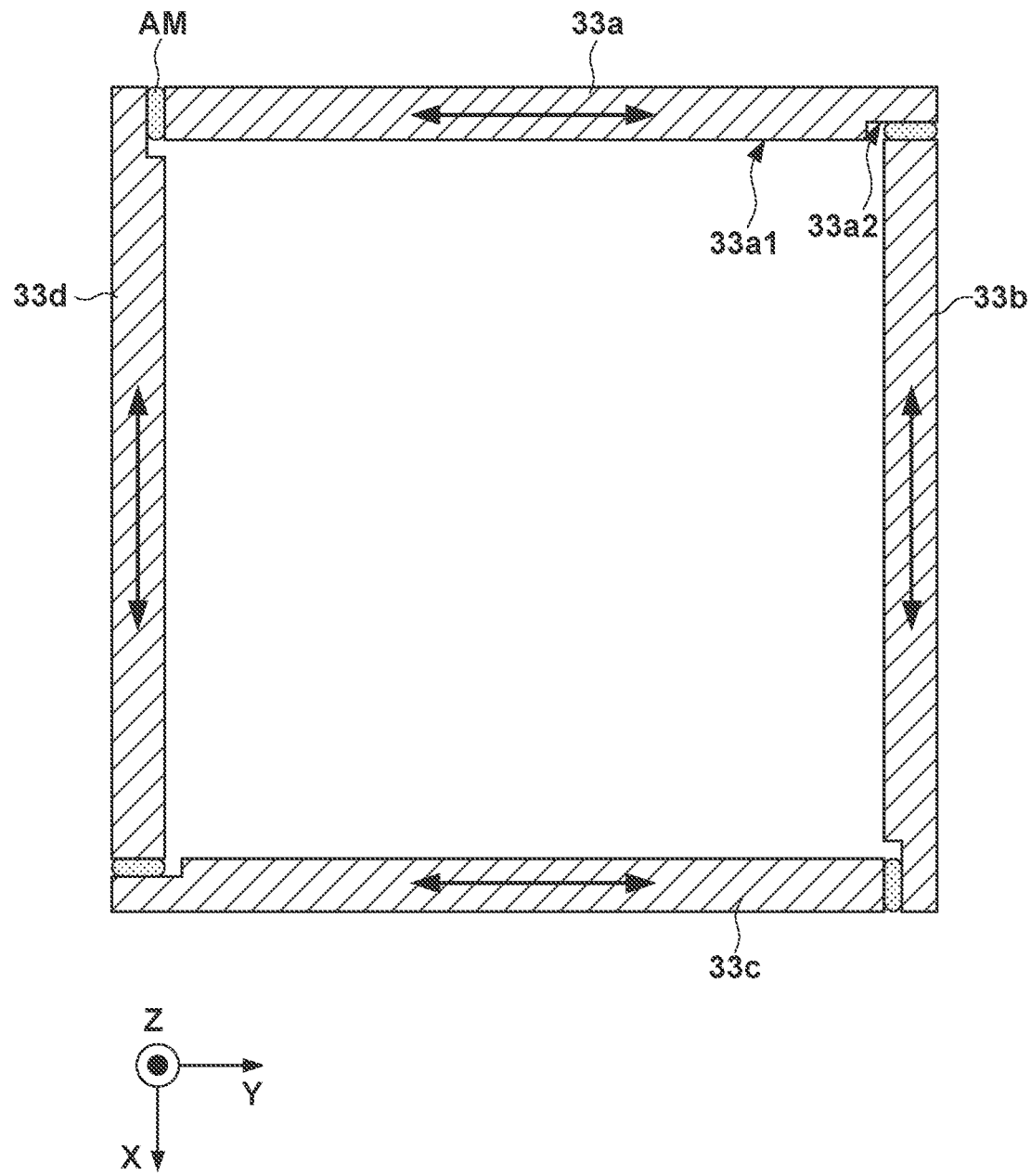
FIG. 5 is a view showing the arrangement of an insulating component according to the third embodiment.

FIG. 5 shows the arrangement of a portion of an insulating component 50 according to the third embodiment. An arrangement in which an insulating member 33 includes four insulating members 33a, 33b, 33c, and 33d connected by an adhesive material AM is shown here. As in the first embodiment, the insulating member 33a includes a first portion having a first surface 33a1, and a second portion having a second surface 33a2, and the adhesive surface (end face) of the insulating member 33b and the second surface 33a2 of the insulating member 33a are connected by the adhesive material AM. As in the first embodiment, the insulating member 33b includes a first portion having a first surface, and a second portion having a second surface, and the adhesive surface (end face) of the insulating member 33c and the second surface of the insulating member 33b are connected by the adhesive material AM. As in the first embodiment, the insulating member 33c includes a first portion having a first surface, and a second portion having a second surface, and the adhesive surface (end face) of the insulating member 33d and the second surface of the insulating member 33c are connected by the adhesive material AM. As in the first embodiment, the insulating member 33d includes a first portion having a first surface, and a second portion having a second surface, and the adhesive surface (end face) of the insulating member 33a and the second surface of the insulating member 33d are connected by the adhesive material AM.

Figure 6:
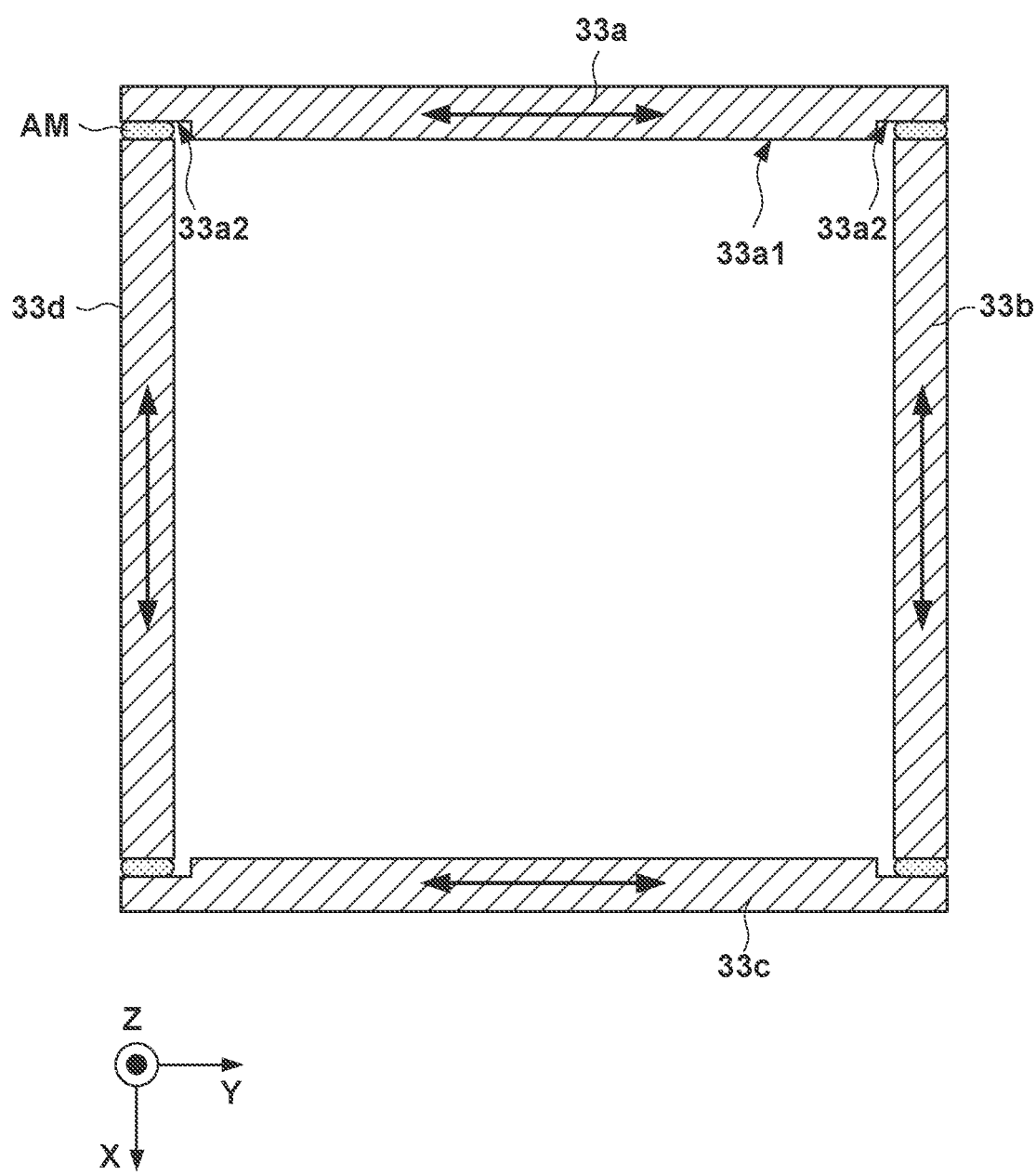
FIG. 6 is a view showing the arrangement of an insulating component according to the fourth embodiment.

FIG. 6 shows the arrangement of a portion of an insulating component 50 according to the fourth embodiment. An arrangement in which an insulating member 33 includes four insulating members 33a, 33b, 33c, and 33d connected by an adhesive material AM is shown here. As in the first embodiment, the insulating member 33a includes one first portion having a first surface 33a1, and two second portions each having a second surface 33a2, and the adhesive surfaces (end faces) of the insulating members 33b and 33d and the two second surfaces 33a2 of the insulating member 33a are connected by the adhesive material AM. As in the first embodiment, the insulating member 33c includes one first portion having a first surface, and two second portions each having a second surface, and the adhesive surfaces (end faces) of the insulating members 33b and 33d and the two second surfaces of the insulating member 33c are connected by the adhesive material AM.

The third and fourth embodiments can also be applied to the arrangement of the insulating member 42. For example, the insulating member 42 according to the first embodiment shown in FIG. 3 can be replaced with a frame-shaped insulating member formed by connecting the four insulating members 33a, 33b, 33c, and 33d by the adhesive material AM, as shown in FIGS. 5 to 6. In this case, the end face of the frame-shaped insulating member serving as the second insulating member 42 can strongly be pressed against the second surface 412 of the first insulating member 41 via the adhesive material AM. This is advantageous for reducing the thickness of the adhesive material AM and suppressing mixing of bubbles in the adhesive material AM. This provides the effect of suppressing discharge via the adhesive material AM in the insulating component 50.

Figure 7:
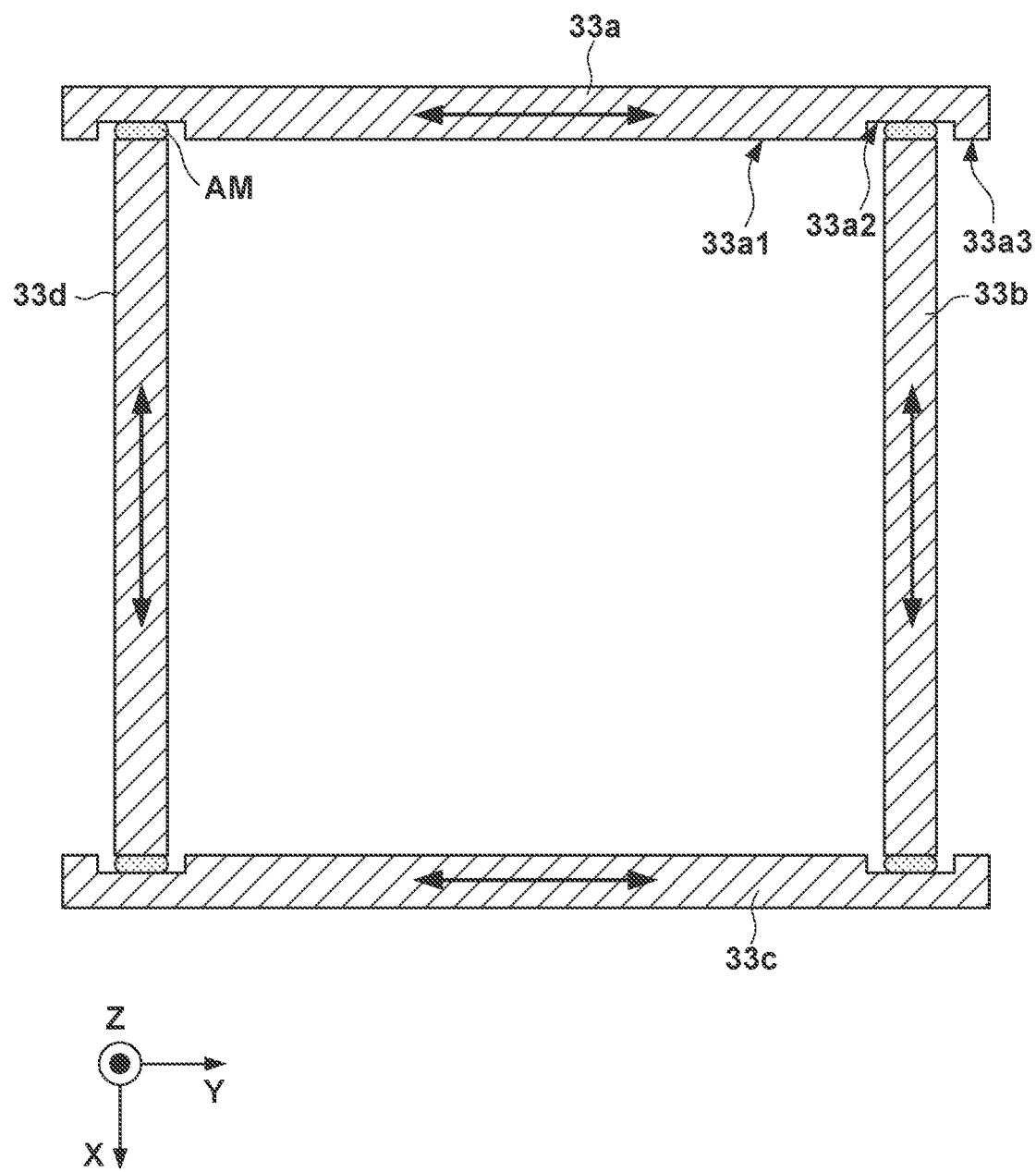
FIG. 7 is a view showing the arrangement of an insulating component according to the fifth embodiment.

FIG. 7 shows the arrangement of a portion of an insulating component 50 according to the fifth embodiment. An arrangement in which an insulating member 33 includes four insulating members 33a, 33b, 33c, and 33d connected by an adhesive material AM is shown here. The fifth embodiment can also be applied to the arrangement of an insulating member 42. As in the second embodiment, the insulating member 33a includes one first portion having a first surface 33a1, two second portions each having a second surface 33a2, and two third portions each having a third surface 33a3, and the adhesive surfaces (end faces) of the insulating members 33b and 33d and the two second surfaces 33a2 of the insulating member 33a are connected by the adhesive material AM. As in the second embodiment, the insulating member 33c includes one first portion having a first surface, two second portions each having a second surface, and two third portions each having a third surface, and the adhesive surfaces (end faces) of the insulating members 33b and 33d and the two second surfaces of the insulating member 33c are connected by the adhesive material AM.

FIG. 8 shows the arrangement of a portion of an insulating component 50 according to the sixth embodiment. The connecting structure between an insulating member 31 and an insulating member 32 is representatively shown here. However, the example of the connecting structure can also be applied to the connecting structure of other insulating members. In the sixth embodiment, to discriminate the insulating member 31 and the insulating member 32 from each other, the insulating member 31 will be referred to as a first insulating member, and the insulating member 32 will be referred to as a second insulating member for the sake of convenience.

The insulating component 50 can include the first insulating member 31 and the second insulating member 32. The first insulating member 31 can be a plate-shaped member including an opening to pass a cable 16. The second insulating member 32 can be a tubular member such as a cylindrical member. The first insulating member 41 can include a first portion having a first surface 311, and a second portion having a second surface 312 that forms a step difference with the first surface 311 and having a thickness smaller than that of the first portion. The adhesive surface (an end face 329 in the example shown in FIG. 8) of the second insulating member 42 and the second surface 312 of the first insulating member 31 are connected by an adhesive material AM. The flatness of the second surface 312 is better than the flatness of the first surface 311. The flatness of the adhesive surface (end face 329) of the second insulating member 32 is preferably better than the flatness of the first surface 311 of the first insulating member 31. Typically, the insulating performance of the adhesive material AM is lower than the insulating performance of the first insulating member 31 and the second insulating member 32. The adhesive material AM can be, for example, an epoxy resin or a phenol resin.

The first surface 311 of the first insulating member 31 forms one main surface of the first insulating member 31. The first insulating member 31 is an insulating member that can be formed by a resin-impregnated glass fabric laminated body, and has a warp and/or an uneven thickness. On the other hand, the second surface 312 of the first insulating member 31 is formed by processing a material used to produce the first insulating member 31. For this reason, the flatness of the second surface 312 is better than the flatness of the first surface 311 that forms the main surface of the first insulating member 31. In addition, the end face 329 that is the adhesive surface of the second insulating member 32 is formed by cutting a material used to produce the second insulating member 32. For this reason, the flatness of the end face 329 of the second insulating member 32 is better than the flatness of the first surface 311 that forms the main surface of the first insulating member 31.

Hence, the arrangement in which the second surface 312 of the first insulating member 31 and the adhesive surface (end face 329) of the second insulating member 32 are connected by the adhesive material AM is advantageous for reducing the thickness of the adhesive material AM and suppressing mixing of bubbles in the adhesive material AM. This provides the effect of suppressing discharge via the adhesive material AM in the insulating component 50. The structure having a step difference between the first surface 311 and the second surface 312 is advantageous for increasing the creepage distance. This can contribute to improvement of the insulating performance.

FIG. 9 shows the arrangement of a portion of an insulating component 50 according to the seventh embodiment. The connecting structure between an insulating member 31 and an insulating member 32 is representatively shown here. However, the example of the connecting structure can also be applied to the connecting structure of other insulating members. In the seventh embodiment, to discriminate the insulating member 31 and the insulating member 32 from each other, the insulating member 31 will be referred to as a first insulating member, and the insulating member 32 will be referred to as a second insulating member for the sake of convenience. The seventh embodiment is a modification of the sixth embodiment.

In the seventh embodiment, the adhesive surface of the second insulating member 32, which is connected to the second surface 312 of the first insulating member 31 by the adhesive material AM, is a surface 328 provided in a notch portion 327 provided in the second insulating member 32. The flatness of the surface 328 is preferably better than the flatness of the first surface 311 of the first insulating member 31. In addition, the flatness of the surface 328 is preferably better than the flatness of an end face 329 of the second insulating member 32. The arrangement of the seventh embodiment may be applied to the first to fifth embodiments. That is, the adhesive surface may be arranged not on the end face of the second insulating member but in a notch portion.

Figure 10:
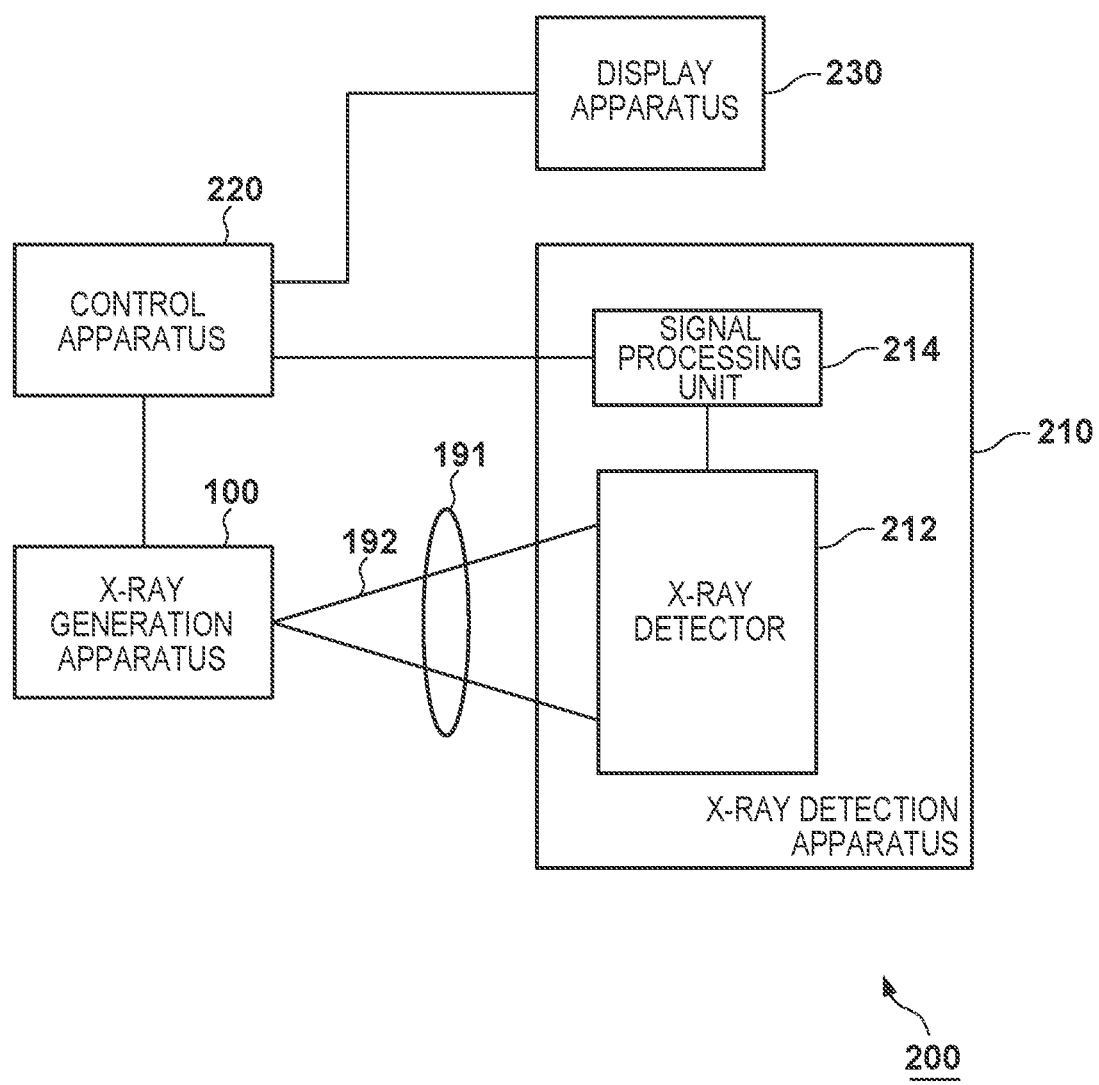
FIG. 10 is a view showing the arrangement of an X-ray imaging apparatus according to an embodiment.

FIG. 10 shows the arrangement of an X-ray imaging apparatus 200 according to an embodiment. The X-ray imaging apparatus 200 can include an X-ray generation apparatus 100, and an X-ray detection apparatus 210 that detects X-rays 192 radiated from the X-ray generation apparatus 100 and transmitted through an object 191. The X-ray imaging apparatus 200 may further include a control apparatus 220 and a display apparatus 230. The X-ray detection apparatus 210 can include an X-ray detector 212, and a signal processing unit 214. The control apparatus 220 can control the X-ray generation apparatus 100 and the X-ray detection apparatus 210. The X-ray detector 212 detects the X-rays 192 radiated from the X-ray generation apparatus 100 and transmitted through the object 191 or captures an image of the X-rays 192. The signal processing unit 214 can process a signal output from the X-ray detector 212 and supply the processed signal to the control apparatus 220. The control apparatus 220 can display an image on the display apparatus 230 based on the signal supplied from the signal processing unit 214.

The present invention is not limited to the above embodiments and various changes and modifications can be made within the spirit and scope of the present invention. Therefore, to apprise the public of the scope of the present invention, the following claims are made.

The invention claimed is:

1. An X-ray generation apparatus comprising:
an X-ray generation unit;
a storage container configured to store the X-ray generation unit; and
an insulating component arranged between an inner surface of the storage container and at least a part of the X-ray generation unit,
wherein the insulating component includes a first insulating member and a second insulating member, the first insulating member includes a first portion having a first surface, and a second portion having a second surface, a step difference is formed by the first surface and the second surface, and the second portion has a thickness smaller than that of the first portion,
an adhesive surface of the second insulating member and the second surface of the first insulating member are connected by an adhesive material, and
a magnitude of deviation of the second surface from a geometrically correct plane is less than a magnitude of deviation of the first surface from the geometrically correct plane.

2. The X-ray generation apparatus according to claim 1, a magnitude of deviation of the adhesive surface from a geometrically correct plane is less than a magnitude of deviation of the first surface from the geometrically correct plane.

3. The X-ray generation apparatus according to claim 1, wherein the first insulating member includes a third portion having a third surface that forms a step difference with the second surface and having a thickness larger than that of the second portion, and the second portion is arranged between the first portion and the third portion to form a concave portion of the first insulating member.

4. The X-ray generation apparatus according to claim 1, wherein the first insulating member is a plate-shaped member.

5. The X-ray generation apparatus according to claim 1, wherein the second insulating member is a plate-shaped member.

6. The X-ray generation apparatus according to claim 1, wherein the second insulating member is a tubular member.

7. The X-ray generation apparatus according to claim 1, wherein the first insulating member is comprised of a glass fabric laminated body impregnated in a resin, and the second surface is orthogonal to a laminating direction of the glass fabric laminated body.

8. The X-ray generation apparatus according to claim 7, wherein the second insulating member is comprised of a glass fabric laminated body impregnated in a resin, and the adhesive surface is parallel to a laminating direction of the glass fabric laminated body that forms the second insulating member.

9. The X-ray generation apparatus according to claim 1, wherein the X-ray generation unit includes an X-ray generation tube, and the X-ray generation tube includes a cathode including an electron emitting portion, and an anode including a target configured to generate X-rays upon electrons radiated from the electron emitting portion collide.

10. The X-ray generation apparatus according to claim 9, wherein the X-ray generation unit further includes a voltage supply unit configured to supply a voltage to the X-ray generation tube.

11. The X-ray generation apparatus according to claim 1, wherein the adhesive material is an epoxy resin.

12. The X-ray generation apparatus according to claim 1, wherein the adhesive surface of the second insulating member is an end face of the second insulating member.

13. The X-ray generation apparatus according to claim 1, wherein the second insulating member includes a notch portion, and the adhesive surface of the second insulating member is a surface provided in the notch portion.

14. An X-ray imaging apparatus characterized by comprising:
    an X-ray generation apparatus of claim 1; and
    an X-ray detection apparatus configured to detect X-rays radiated from the X-ray generation apparatus and transmitted through an object.

\* \* \* \* \*